T. T. Ponsonby,
Carving Wood.
No. 95,833.   Patented Oct. 12, 1869.
2 Sheets Sheet 1.
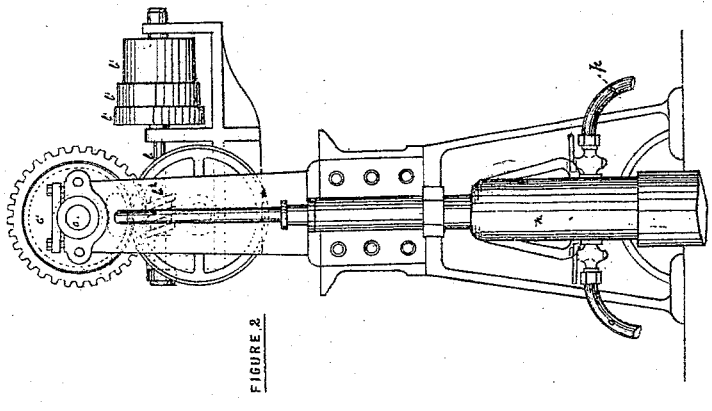
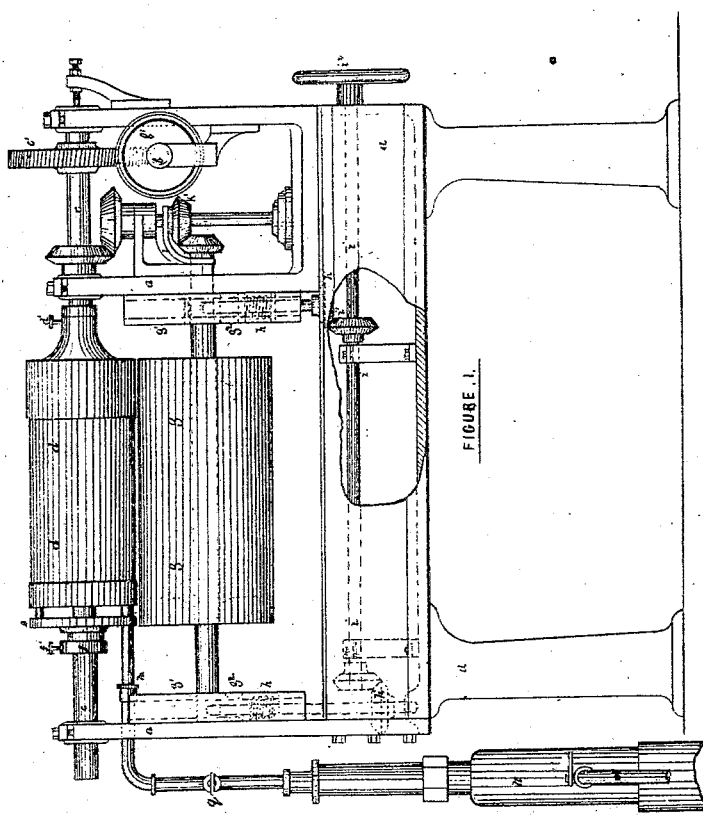
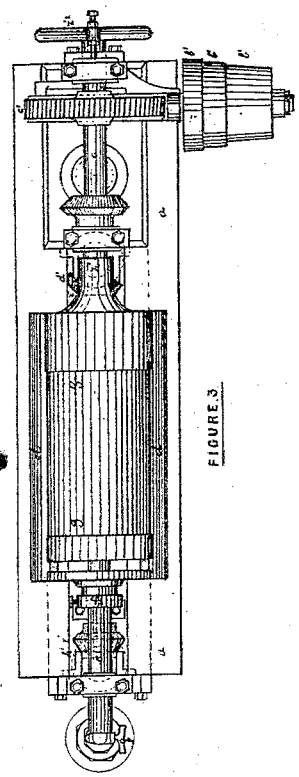
Witnesses: William Walker, J. H. Redmond
Thomas T. Ponsonby

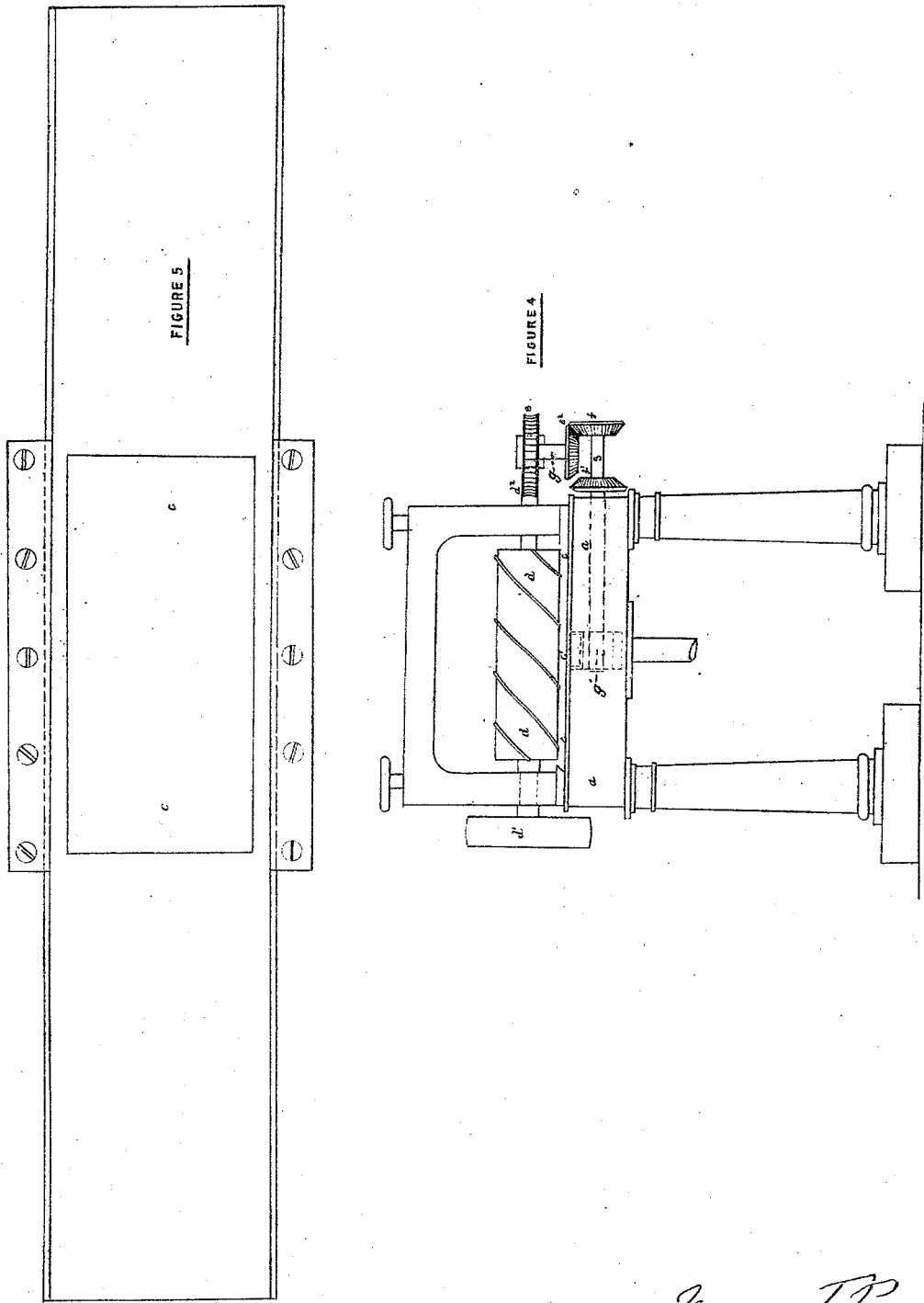

United States Patent Office.

THOMAS THOMPSON PONSONBY, OF LIVERPOOL, ENGLAND, ASSIGNOR TO JOHN ANDERSON, OF SAME PLACE.

*Letters Patent No. 95,833, dated October 12, 1869; patented in England, September 5, 1865.*

IMPROVEMENT IN MACHINE FOR SURFACING AND ORNAMENTING WOOD.

The Schedule referred to in these Letters Patent and making part of the same.

*To all to whom it may concern:*

Be it known that I, THOMAS THOMPSON PONSONBY, of Liverpool, in the county of Lancaster, in that part of the United Kingdom of Great Britain and Ireland called England, have invented certain new and useful Improvements for Ornamenting and Surfacing Veneers and other articles of wood, and which is chiefly applicable to certain machinery invented by Thomas Clayton and Robert Harrop, and for which they applied for Letters Patent for Great Britain, on the 26th of September, 1854, but which application was abandoned, the machine, constructed according to the description in the provisional specification, having been found inefficient, when certain improvements were made by the said Thomas Clayton, and for which he obtained Letters Patent for Great Britain, dated 19th February, 1857, which said patent-right was purchased and carried out in Great Britain by a limited-liability company, called the Ornamental Pyrographic Wood-Work Company, near London, Great Britain, and which has subsequently been sold to me, the said THOMAS THOMPSON PONSONBY, and I am now the sole proprietor of said patent.

Now, this, my said invention, relates to certain improvements on the machinery invented by Thomas Clayton and Robert Harrop, and the said Thomas Clayton, respectively, and for which I, the said THOMAS THOMPSON PONSONBY, obtained her Majesty's Letters Patent, bearing date the 5th day of September, 1865.

I do hereby declare that the following is a full and exact description thereof, reference being had to the accompanying drawings, and to the letters and figures of reference marked thereon.

This, my said invention, has for its object improvement in ornamenting and surfacing veneers and other articles of wood.

In ornamenting veneers, I employ heated cylinders, in a manner similar to that described in the specification of a patent granted to Thomas Clayton, and dated 19th February, 1857, (No. 448.)

As heretofore, the veneer, (which, by preference, is of soft white wood,) is passed under a metal cylinder, on which the patterns to be produced on the veneer are deeply engraved, or left in relief on the cylinder, according to the effect intended to be produced. This cylinder is heated sufficiently to char the surface of the veneer, which is pressed up to the cylinder by a roller underneath.

The depth of the engraving on the cylinder is such that the recessed parts do not touch the veneer, which, consequently, escapes charring at these points.

Heretofore, the ornamenting-cylinder has had a bearing at one end only, the other end being left open for the introduction of a gas-burner for heating the cylinder. According to my invention, I employ a bearing at each end of the cylinder, by which means I obtain much greater rigidity.

For heating the cylinder, I employ a current of common gas and atmospheric air, so mixed, prior to entering the cylinder, as to produce, when lighted, the necessary amount of heating-power; or, I may employ heated air, which is introduced into the cylinder through one of the axes, which is made hollow, and it is allowed to escape by holes at the other end of the cylinder.

The roller by which the veneer is pressed against the cylinder I also, according to my invention, drive at the same surface-speed as the cylinder, in place of leaving it free, as heretofore. By this means, the veneer is caused to pass with greater certainty. I press up this roller also, by means of a spring, in place of by a weight, as heretofore; or, by preference, I use a worm and pinion-wheel motion, as shown in the drawings.

Similar machinery may be employed in ornamenting surfaces of wood, whatever the thickness of the piece.

Figure 1 is a front view, and

Figure 2 is an end view of a machine for ornamenting veneers according to my invention.

$a\ a$ is the frame of the machine.

$b$ is a shaft, mounted in bearings upon it, and driven by a belt passing around one or other of the driving-pulleys $b^1\ b^1$.

$b^2$ is a worm on the same shaft, gearing with a worm-wheel, $c^1$, on the axis $c$.

This axis is carried in fixed bearings on the frame, as is shown, and on it the pattern-cylinder $d$, which is suitably engraved, and, by preference, of cast-iron, as heretofore, is clamped by the set-screw $d^1$.

The further end of the cylinder $d$ is supported, and kept truly central with the axis, by means of the disk $e$, which fits into the end of the cylinder, and is also able to turn freely on the axis.

$f$ is a ring on the axis $c$, clamped to it by the set-screw $f^1$, to prevent the disk $e$ moving lengthwise on the axis after it has been set in its place. The ring $f$ can, however, be shifted to accommodate pattern-cylinders of different lengths.

$g$ is a lower cylinder, to press the veneer up to the upper pattern-cylinder $d$. Its bearings slide in guides $g^1\ g^1$, and rest on springs $g^2\ g^2$, which are supported on the upper ends of the screws $h\ h$, and these screws pass through screw-nuts fixed on the frame.

At their lower ends, the screws are stepped on to the frame $a$, and they have bevelled pinions $h^1\ h^1$ keyed upon them.

These pinions gear with other similar pinions, $i\ i$, on the axis $i$, at the end of which is a hand-wheel, $i^2$, by turning which, it will be seen that the position of the lower cylinder $g$ can be adjusted to accommodate any thickness of veneer, and any amount of pressure which may be desirable may be applied.

In order to drive the cylinder $g$ at the same surface-speed as the cylinder $d$, it has a bevelled pinion, $g^3$, on its axis, gearing with another pinion, $k^1$, on the vertical axis $k$.

This pinion $k^1$ is able to slide on its axis, but is prevented turning independently thereof, by a groove and feather.

The two pinions $g^3$ and $k^1$ are held together by the connecting-strap $l$.

In order to heat the pattern-cylinder $d$, gas is applied in the following manner:

A perforated pipe, $m$, is passed from end to end of the cylinder $d$. This pipe passes through the disk $e$, which is thus held stationary, and is connected with a vessel, $n$, into which ordinary coal-gas is admitted, by a pipe, $o$, on which is a regulating stop-cock.

$p$ is another pipe, also furnished with a stop-cock, by which air, under pressure, is admitted to the same vessel $n$. This compressed air may be obtained from a fan, constantly driven, or otherwise.

$q$ is a stop-cock, by which the mixture of gas and air is regulated in passing to the perforated pipe $m$, through which it escapes, and is burnt, and the cylinder $d$ is thus heated to the degree required.

The cylinder is open at both ends, to allow of the free escape of the products of combustion. I usually drive this cylinder $d$ at a surface-speed of about one foot per minute.

The veneer to be ornamented is entered between the cylinders $d$ and $g$, and pressure being applied, by means of the hand-wheel $i^2$, it becomes charred as it passes between the cylinders, to the depth required.

The veneer, after having been passed under the ornamenting-cylinder, is scraped, in order to smooth the surface and clear the lights of the design. I employ, for this purpose, a bench, the top of which is a chest, from which the air can be exhausted. It is perforated at the upper part, and the veneer is laid upon it over the perforations. The air is then exhausted, more or less, and so the veneer is held down against the surface, and is, at the same time, kept flat.

While so held, the surface is scraped by a suitable tool, or this bench may be fitted with a frame having two rollers which bear on the veneer, and the frame is so weighted as to press heavily on the surface.

The frame also carries two knives outside the rollers, and these are inclined so that one may scrape in each direction, and these can be set, by screws, to any depth required.

To give the final finish to the surface, I use the same tool, substituting, in place of the knives, blocks covered with sand-paper.

The same tool may also be employed for roughening the backs of the veneers, to give a key for the glue, a serrated cutter being then employed in place of the knives.

In place of moving the frame and cutters to and fro, the bench supporting the work may have motion given to it, as before described.

The scraping-apparatus may also be advantageously employed in preparing the veneers before they are submitted to the action of the heated cylinder.

Also, according to my invention, I apply color to the veneer or surface, after it has been passed under the pattern-cylinder, and, in this case, I may arrange the machinery so that the wood is first passed under the scraping-knives, and surfaced, and then continuously, first under the pattern-cylinder, then under the scraping-knives, and afterward under a printing-cylinder, which applies the color in such manner that the impression of the printing-cylinder registers with the pattern before produced by the hot cylinder.

Figure 4 is an end view, and

Figure 5 is a portion of a plan of a scraping and smoothing-apparatus constructed according to my invention.

A A is a chest, from which the air is exhausted by a pump, worked in any convenient manner.

C is a table, sliding in guides on the top of the chest A. Its centre portion is perforated, and over these perforations the veneer to be operated on is laid, and it is, by the vacuum in the chest, sucked down flat on to the surface of the table.

The table C is caused to travel to and fro under a suitable scraping-apparatus. That shown in the drawing is a roller, $d$, with spiral blades upon it. It is driven by a strap passing around the pulley $d^1$, on its axis.

The table C receives its traversing motion from a worm, $d^2$, on the axis of the scraping-roller $d$. It gears with a screw-wheel, $e$, on the axis $e^1$, carried in bearings on the frame.

$e^2$ is a bevelled pinion on the axis $e^1$, and $f\ f^1$ are other bevelled pinions on the axis $g$. These pinions are so arranged that one or other of them can be made to gear with the pinion $e^2$, by means of a suitable hand-lever, according as it is desired to drive the table $c$ in one or other direction.

The axis $g$ gives motion to the table by means of a pinion, $g^1$, upon it, which gears with a rack, $c^1$, on the under side of the table C. The moving parts are fitted to the top of the vacuum-chest A, in such a manner as to avoid, as far as possible, the leakage of air.

Having now fully described and ascertained the nature of this, my said invention, and how the same is to be performed, I wish it to be understood that I do not confine myself to relative proportions or dimensions of the several parts of the apparatus as hereinbefore described and illustrated, as it will be readily seen the same may be considerably varied, without departing from the invention; but

What I claim as new, and my invention, is—

1. Mounting the engraved cylinder $d$ upon the disk-bearing $e$, fitted into the end of said cylinder, in such a manner that the latter may turn freely upon its axis, as described, and for the purposes set forth.

2. The cylinder $d$, disk-bearing $e$, with its sleeve and ring $f$, fastened by set-screw $f^1$, together with shaft $c$, when the parts are constructed for the purposes specified, as described.

3. The arrangement of the driving-gear, consisting of cone-pulleys $b^1$, screw-pinion $b^2$, gear-wheel $c^1$, shaft $c$, and gearing $k^1$, in connection with brace $b$, when the parts are constructed and operated as described, for the purpose set forth.

4. The spirally-grooved and serrated rollers $d\ d$, in combination with the table C, operating as described, for the purpose specified.

In witness whereof, I, the said THOMAS THOMPSON PONSONBY, have hereunto set my hand, and affixed my seal, this 18th day of July, 1868.

THOMAS THOMPSON PONSONBY. [L. S.]

Witnesses:
ROB. NORMAN,
THEO. F. NESBITT.